Oct. 6, 1970
J. E. WIKLUND
3,532,471
DEVICE FOR CONCENTRATION CONTROL IN DRYING TOWERS FOR A
SULPHURIC ACID PLANT
Filed Oct. 11, 1967
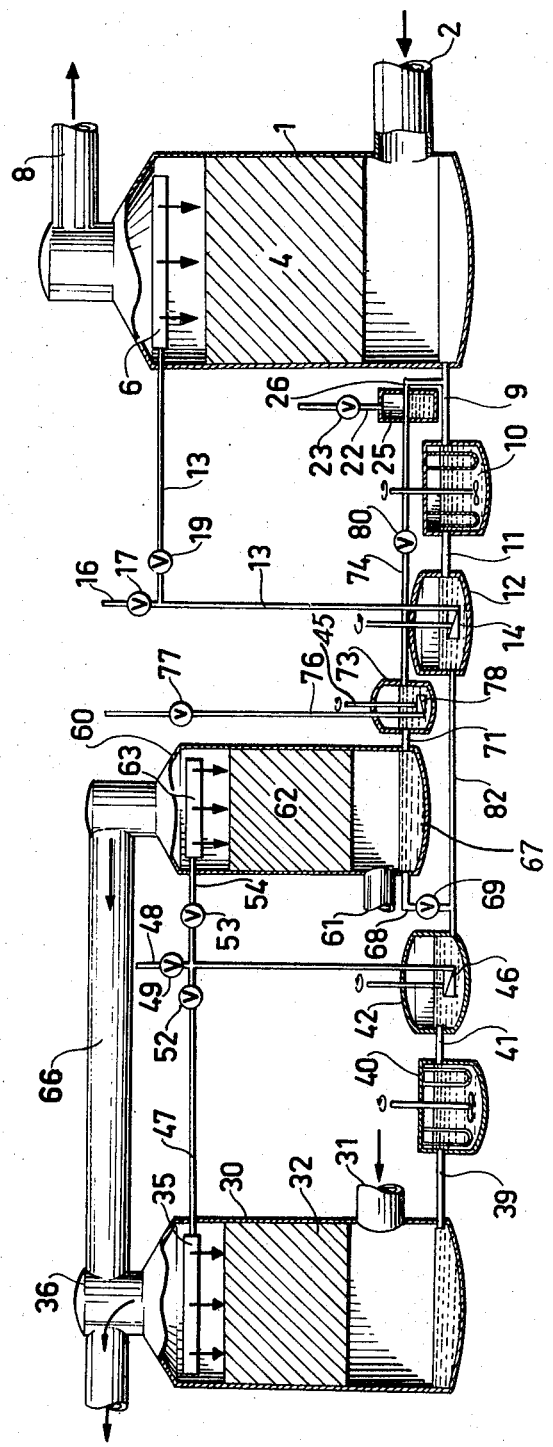
INVENTOR
JOHAN ELOF WIKLUND
BY
ATTORNEYS United States Patent Office 3,532,471
Patented Oct. 6, 1970

3,532,471
DEVICE FOR CONCENTRATION CONTROL IN DRYING TOWERS FOR A SULPHURIC ACID PLANT
Johan Elof Wiklund, Halsingborg, Sweden, assignor to Boliden Aktiebolag, Stockholm, Sweden, a company of Sweden
Filed Oct. 11, 1967, Ser. No. 674,494
Claims priority, application Sweden, Oct. 19, 1966, 14,243/66
Int. Cl. C01b 17/80
U.S. Cl. 23—261                                 8 Claims

ABSTRACT OF THE DISCLOSURE

A sulphuric acid plant including a sulphur trioxide absorption tower (1), a sulphur dioxide drying tower (30), a stripping tower (60), and storage containers (12, 46) are arranged so as to control the acid concentration in a drying tower and to minimize pumping requirements.

The invention relates to the production of sulphuric acid and particularly to a device for controlling the concentration of sulphuric acid in a sulphuric acid plant's drying circuit for drying the sulphur dioxide to be oxidized to sulphur trioxide in an oxidation apparatus for this purpose, usually operating according to the contact process. In addition to this apparatus the plant includes an absorption circuit for absorbing sulphur trioxide in highly concentrated sulphuric acid (for instance about 98 percent by weight), comprising at least one absorption tower and at least one storage container positioned at a lower level than the absorption tower and pumping means for circulating sulphuric acid from the container to the upper part of the tower and back, and a drying circuit for drying air and/or sulphur dioxide with sulphuric acid having a relatively low concentration (for instance about 95 percent by weight), comprising at least one drying tower and at least one storage container positioned at a lower level than the drying tower and pumping means for circulating sulphuric acid from the container to the upper part of the drying tower and back, and a first conduit arranged unidirectionally to conduct sulphuric acid from the absorption circuit to the drying circuit, and a second conduit arranged unidirectionally to conduct sulphuric acid from the drying circuit to the absorption circuit. The acid circulating in the drying circuit has an essential content of dissolved sulphur dioxide, which is carried to the absorption circuit and released therefrom with the exhaust gases causing losses in the production and damages to the surroundings, unless a particular stripping tower is inserted in the drying circuit before diverting the acid to the absorption circuit through said second conduit. Such stripping tower is usually supplied at its top with acid from the storage container of the drying circuit while air is injected into the bottom of the tower, where stripped acid is collected and wholly passed to the absorption circuit. The expelled sulphur dioxide is returned to the process, either to the bottom of the drying tower or to the exhaust gas therefrom passing to the oxidation apparatus. The sulphuric acid absorbs the moisture from the sulphur dioxide gas in the drying tower and from the air used in the stripping tower.

As a product of the process highly concentrated acid can be removed from the absorption circuit, for instance from the storage container thereof, or acid of less concentration, suitably after the stripping tower. In the latter case the concentration of the sulphuric acid in the drying circuit will have to be carefully controlled and adjusted. This is a great problem, which is clear, i.e., from Dionys Singa, Chem. Techn. 15 (1963), pp. 83–87. Because of the fact that the supply of sulphur dioxide to the drying circuit often fluctuates considerably with irregularities in the operation of the sulphur or pyrite furnaces producing the sulphur dioxide, the moisture absorption in the drying circuit and thereby the concentration of the sulphuric acid vary considerably. In order to counteract this variation the supply of acid from the absorption circuit must be controlled, which in turn requires changing and adjusting the flow from the drying circuit to the absorption circuit and possibly the circulation in the circuits. This will be particularly complicated when stripping towers are involved, which is necessary when the drying circuit acid is a product to be marketed.

By the invention these inconveniences are eliminated and other operational advantages are gained, particularly a fast and simple control of the operation, including the concentration, and saving of working people. Moreover, in a plant according to the invention no pumps are required for the transportation between the circuits, merely for the circulation within each of these. This is of a great importance as acid pumps have to be made from expensive materials and the pumping work would be extensive, as sulphuric acid is heavy and great quantities to be transported are involved, also the need of control means, such as valves, is restricted to a minimum. The acid level in the system is easily maintained constant and at the desired value, and above all at the same level in both of the absorption and drying circuits. The invention is characterized in that said first communicating conduit connects the storage container of the absorption circuit with the storage container of the drying circuit, and the second communicating conduit connects the drying circuit at a level above the storage container thereof with the absorption circuit, and that a means is arranged for controlling the flow in said second conduit. If the plant also includes a stripping tower with a contact zone for gas and liquid and an air inlet at its lower end, it should also be equipped with a collecting container which is arranged at a level below the contact zone and communicates with the stripping tower and is also connected to said second conduit and positioned at a level above the storage container of the drying circuit. The storage container is connected with the collecting container by means of a fall conduit, and with the upper part of the stripping tower by means of a pump conduit. The flow control in said second conduit between the circuits is suitably carried out with a control member, for instance a choking element, in the conduit itself. If a stripping tower is present the fall conduit may contain a flow controlling member, for instance a choking or restricting element, whereby also the flow in said second conduit can be controlled.

The second communicating conduit is, according to the invention, of particular importance as the weaker acid to be discharged as a trade product is preferably discharged from the collecting container through the second communicating conduit and/or as the additional water required for the absorption process is preferably supplied to said conduit further on in the flow direction, preferably in a particular mixer.

The invention will now be more closely described in connection with a non-limiting embodiment shown in the drawing.

Sulphur trioxide from an oxidation plant, for instance a contact apparatus, not shown, is supplied to the bottom section of an absorption tower 1 through a pipe stud 2. Residual air from the oxidation is entrained in the sulphur trioxide. The gases ascend in the tower through a packing 4, over which concentrated sulphuric acid, usually 98 percent, percolates, supplied at the top of the tower and distributed by means of distributor 6. The sulphur trioxide is absorbed in the acid and the residual gases are exhausted through the gas outlet 8. Sulphuric acid collected at the bottom flows through pipe 9 to a cooler 10, suitably of the type described in patent application No. 511,418, now Pat. No. 3,373,802. From the cooler the acid is passed through a conduit 11 to a storage container 12, from which an ascending conduit 13 provided with a pump 14 extends upwardly and is connected with the distributor 6, A product conduit 16 is branched off from conduit 13 and is provided with a cock or valve 17 for discharging process product in the form of concentrated sulphuric acid. Conduit 13 has a cock or a valve 19.

Water required for the formation of sulphuric acid is supplied through a conduit 22 provided with a cock or a valve 23 and opening into a mixer 25, which is connected to the conduit 9 of cooler 10 by means of a conduit 26.

The sulphur dioxide gas flowing from a combustion or roasting furnace is supplied to the bottom section of a drying tower 30 through a gas conduit 31 and is allowed to ascend through a section of the tower filled with packing 32. Through said section there flows a sulphuric acid of relatively low concentration, usually about 95 percent, distributed by a distributor 35. The sulphur dioxide dried by the acid escapes through the gas outlet 36. The sulphuric acid, somewhat diluted by the moisture from the sulphur dioxide and collected at the bottom of tower 30, is passed through the conduit 39 to a cooler 40, suitably of the same type of cooler 10, and from there through conduit 41 to the storage container 42. A conduit 45 having a pump 46 at its bottom extends upwards from the lower part of this container and is connected with the distributor 35 in the tower 30 by means of a branch conduit 47. A tapping conduit 48 with a cock 49 may be connected to the conduit 45 for tapping off acid, as in the absorption plant. In this connection a cock 52 in conduit 47 and a cock 53 in another branch conduit 54 leading to a stripping tower may be closed.

The acid circulating between the tower 30 and the storage container 42 contains sulphur dioxide, and in a preferred embodiment the acid is subjected to aeration in a stripping tower 60, into the bottom section of which air is injected through a conduit 61. The air ascends through a packed section 62, through which the sulphuric acid percolates downwardly distributed by means of a distributor 63 supplied with acid through conduit 54. The air containing sulphur dioxide is removed at the top of the tower through a gas conduit 66, which in the case shown is connected with the gas conduit 36 from the tower 30 but could lead to the bottom of the tower 30. The conduits 36 and 66 usually lead to the combustion or roasting furnaces. The acid having flown down through the packed section 62 accumulates in a collecting container 67 positioned at a higher level than the storage container 42, with which it is connected by means of conduit 68, suitably containing control means 69, for instance a choking valve, and leading to the storage container 42. This establishes a circulating system between the storage container and the stripping tower 60.

From the collecting container 67 a conduit 71 extends, suitably from a lower level than that of conduit 68, to a product container 73, connected with the mixer 25 by means of a conduit 74 and thus with the absorption circuit, wherein strong sulphuric acid circulates between the absorption tower 1 and the storage container 12.

Sulphuric acid at relatively low concentration, in this case about 95 percent, is removed from the product container 73 through an ascending conduit 76 containing a cock or valve 77 and, in the container 73, a pump 78.

The flow of low concentration sulphuric acid from the drying circuit through the conduit 74 can be controlled by means of controlling member 80, for instance a choking valve, in the conduit 74. On the other hand, the absorption circuit is connected with the drying circuit by means of a conduit 82 connecting the lower part of the storage container 12 with the lower part of the storage container 42. In this way both circuits are incorporated in a common circulation system, so that except for the separate circulation of a strong and a weaker sulphuric acid, respectively, within each circuit, also a circulation or transport of sulphuric acid takes place unidirectionally from weak to strong acid at a higher level and from strong to weak acid at a lower level. In view of the fact that the collecting container 67 is positioned at a higher level than are the storage containers 12 and 42 no circulating means are required for the transport between the systems in addition to the circulating means necessary for the separate circulations in the circuits, particularly the drying circuit. The circulation between the circuits is suitably controlled with the control means 80 in conduit 74 conducting weak acid to the absorption system. However, control can also be done with control member 69 in the fall conduit 68 from the collecting container 67, making it possible to let conduit 68 open at a lower level in the collecting container 67 than conduit 71. When control member 69 is choked the liquid level in the container 67 rises and the flow in conduit 74 increases.

The invention is particularly advantageous in the following respects. In view of the fact that both circuits communicate with each other at a low level the liquid level is the same in both circuits and this level can be adjusted to an adequate value by controlling the amount of product discharged. This can be effected in a particularly easy way since a conduit connects the circuits with each other, suitably through a connecting container, also at a level above the storage containers, the trade product acid being discharged from said conduit and the remainder flowing down into the bottom part of the absorption circuit by gravity.

The invention can be applied also in case it is not necessary to dry the sulphur dioxide although the air used for producing the sulphur dioxide is moist. This is the case, for instance, if the sulphur dioxide is produced by combustion of sulphur. Then, instead of gas containing sulphur dioxide the moist air is supplied to the drying tower and the dried air is passed to the sulphur combustion plant, from where dry sulphur dioxide escapes and is passed directly to the oxidation plant. In this case no stripping tower is needed, but also in this case one should have a collecting container 67 at a higher level than the storage containers.

What is claimed is:

1. In a plant for the production of sulphuric acid comprising an absorption circuit for absorbing sulphur trioxide in highly concentrated sulphuric acid, comprising at least one absorption tower (1), at least one first storage container (12) positioned at a lower level than said absorption tower, pumping means (14) for circulating the sulphuric acid from said first container to the upper part of said tower and back to said first container; and a drying circuit for drying sulphur dioxide and air with sulphuric acid having relatively low concentration including at least one drying tower (60), at least one second storage container (42) positioned at a lower level than said drying tower, pumping means (46) for circulating sulphuric acid from said second storage container to the upper part of said drying tower and back to the container; a first liquid sulphuric acid communicating conduit (82) arranged unidirectionally to conduct sulphuric acid from said absorption circuit to said drying circuit, and a second liquid sulphuric acid communicating conduit (74) arranged unidirectionally to conduct sulphuric acid from said drying circuit to said absorption circuit, the improvement characterized in that said first conduit (82) connects said first storage container (12) with said second storage container (42), and said second conduit (74) connects the lower portion of said drying tower (60) with the lower portion of said absorption tower (1), and that at least one member (80, 69) is arranged for controlling the flow in said second conduit (74).

2. A plant according to claim 1, characterized in that at least one of said first and second conduits (82 and 74) is free from pumping means and comprises a conduit arranged for free flow in the flow direction, the second conduit (74) containing a choking member (80).

3. A plant according to claim 1, characterized in that said first conduit (82) connects said storage containers (12, 42) near the bottoms thereof, which lie at approximately the same level.

4. A plant according to claim 1, wherein said drying circuit comprises a stripping tower (60) for stripping off sulphur dioxide from sulphuric acid of relaatively low concentration, said tower having a contact zone (62) for gas and liquid and an air inlet (61) arranged at the lower part thereof, characterized by a collecting container (67) which is arranged at a level below the contact zone, is connected to the stripping tower (60) and to said second conduit (74), and is positioned at a level above the storage container (42) of said drying circuit, said storage container being connected, on the one hand, with the collecting container (67) by means of a fall conduit (68), and, on the other hand, with the upper part of the stripping tower by means of a pump conduit (45, 54).

5. A plant according to claim 4, characterized in that the fall conduit (68) contains a flow controlling member (69) in the form of a choking member, whereby also the flow in said second conduit (74) can be controlled.

6. A plant according to claim 4, characterized in that said fall conduit (68) opens at a lower level in the collecting container (67) than does said second conduit (74).

7. A plant according to claim 4, characterized by a discharge conduit (76) for sulphuric acid of relatively low concentration collected in the collecting container (67), connected with said second communicating conduit (74), by a product container (73) connected with collecting container (67) by means of a direct conduit (71).

8. A plant according to claim 1, characterized by a water supply conduit (22) connected to said second communicating conduit (74) and opening in a mixer (25) inserted in said second conduit.

References Cited

UNITED STATES PATENTS

| | | | |
|---|---|---|---|
| 1,456,064 | 5/1923 | Lamoreaux | 23—168 |
| 1,957,265 | 5/1934 | Hansen (II) | 23—260 XR |
| 2,001,359 | 5/1935 | Hechenbleikner | 23—261 XR |
| 2,029,262 | 1/1936 | Hansen (I) | 23—260 XR |
| 2,337,060 | 12/1943 | Munson et al. | 23—261 XR |
| 2,471,072 | 5/1949 | Merriam | 23—167 |

FOREIGN PATENTS 852,073  10/1960  Great Britain.

JOSEPH SCOVRONEK, Primary Examiner

D. G. MILLMAN, Assistant Examiner

U.S. Cl. X.R.

23—168